April 11, 1967   M. J. JOHNSON   3,314,007
ALTERNATOR OPERATED TACHOMETER CIRCUIT
Filed Feb. 17, 1964   2 Sheets-Sheet 1
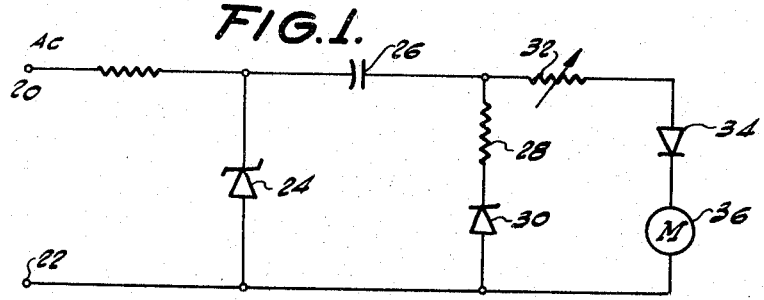
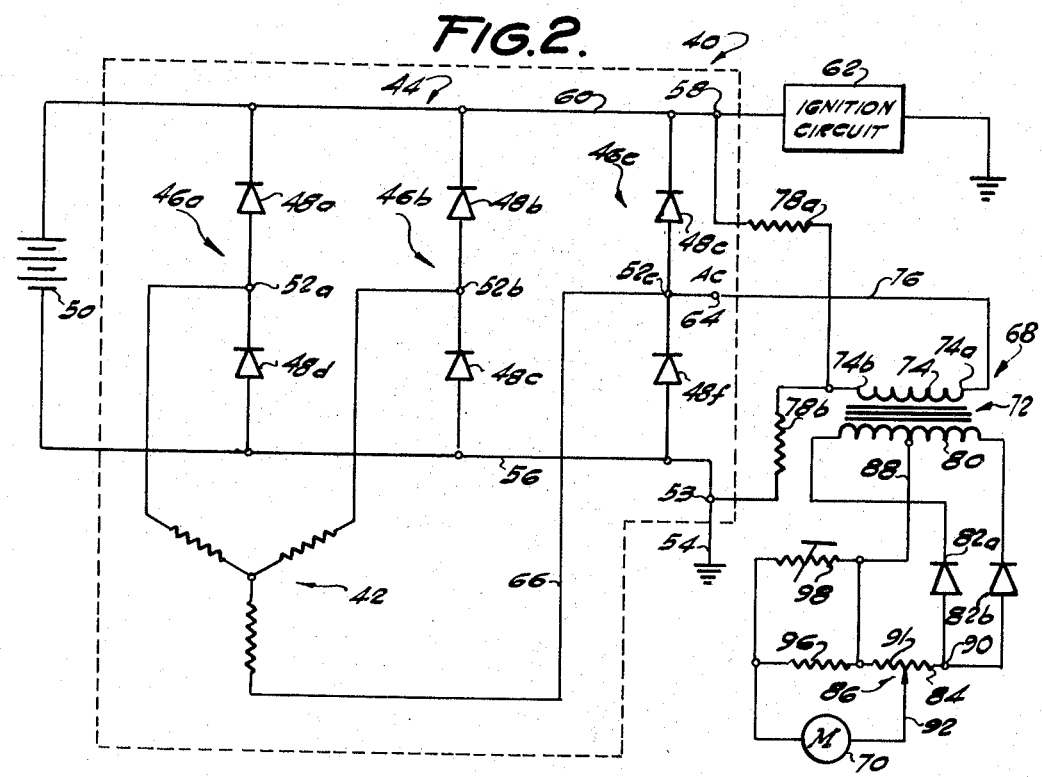
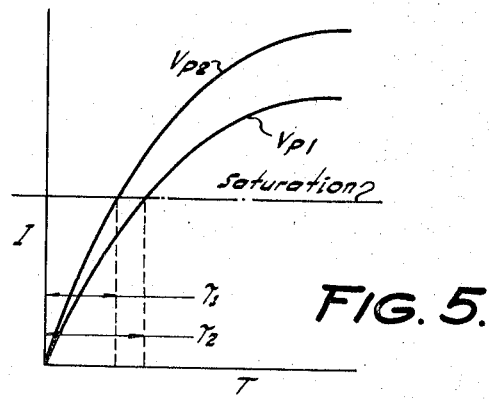
INVENTOR
Myron J. Johnson INVENTOR
Myron J. Johnson

United States Patent Office 3,314,007
Patented Apr. 11, 1967

3,314,007
ALTERNATOR OPERATED TACHOMETER CIRCUIT
Myron J. Johnson, Arlington Heights, Ill., assignor to Stewart-Warner Corporation, Chicago, Ill., a corporation of Virginia
Filed Feb. 17, 1964, Ser. No. 345,354
5 Claims. (Cl. 324—70)

This invention relates to tachometers and more particularly to tachometers of the type used to measure the speed of internal combustion engines which drive alternators to provide electric power, (such as, for example, automobile engines and truck diesel engines).

Generally, the tachometers previously used took the form of the circuit diagram shown in FIG. 1 of the drawings, whether driven from the ignition system of a spark ignited engine or from an alternator driven by a diesel engine. In this tachometer circuit a portion of the spark signal appeared at the input terminals 20, 22. A regulated pulse signal appeared across zener diode 24 which charged capacitor 26 through resistor 28 and diode 30 along the leading edge thereof. At the end of the pulse, capacitor 26 began discharging through a calibration resistor 32, diode 34 and electric meter 36. It may be readily seen that the capacity of the tachometer to properly register high speeds depends upon the discharge time of the capacitor 26 through the calibration resistor 32 and meter 36. In order for the device to measure high speeds a small RC time constant is required which limits the value of the capacitor 26 which may be used. Thus, the current deliverable to the meter 36 is limited and a very sensitive meter movement is required.

It can also be seen from FIGURE 1 that the prior art tachometers were polarity sensitive in view of the diodes used therein. This required special care in connecting the tachometer to the ignition system to prevent damaging the components of the system.

It is an object of this invention to provide a tachometer which is able to measure relatively high speeds with meters having relatively low sensitivity.

It is also an object of this invention to provide a tachometer having a saturable transformer drive circuit operable off of an engine ignition system alternator of the type including a bridge rectifier for supplying a D.C. charging potential to a battery.

Another object of this invention is to provide a tachometer circuit which is insensitive to the electrical polarity of the system to which it is connected for driving a tachometer from an alternator having a rectified output.

It is also an object of this invention to provide a tachometer which may be used with any alternator having at least one A.C. terminal.

A further object of this invention is to provide a tachometer having a voltage regulation as well as temperature compensation.

In addition it is an object of this invention to provide a tachometer which is of simple construction utilizing a minimum of inexpensive components.

The device of this invention presents a new approach to tachometry in which the driving signals are obtained from an alternator used in many present day engine ignition systems to provide the D.C. currents for spark ignition. The primary of a saturable transformer is specially connected to the alternator so that the transformer is driven to saturation with each phase reversal of the primary. If the saturable transformer has a substantially rectangular hysteresis curve, current pulses of substantial magnitude will appear in the transformer secondary which may be integrated and applied to a relatively insensitive meter for indicating the frequency of alternations from the alternator. Since the alternator is driven by the engine the output is then a measure of the speed of the engine.

This invention will be better understood upon a further reading of this specification especially when taken in view of the remaining drawings depicting the invention in which:

FIGURE 2 is a diagram of the tachometer circuit and the alternator from which it is driven;

FIGURE 5 is a graphical representation of the variation of primary current versus time indicating the voltage regulation effect of the saturable transformer.

Figure 3:
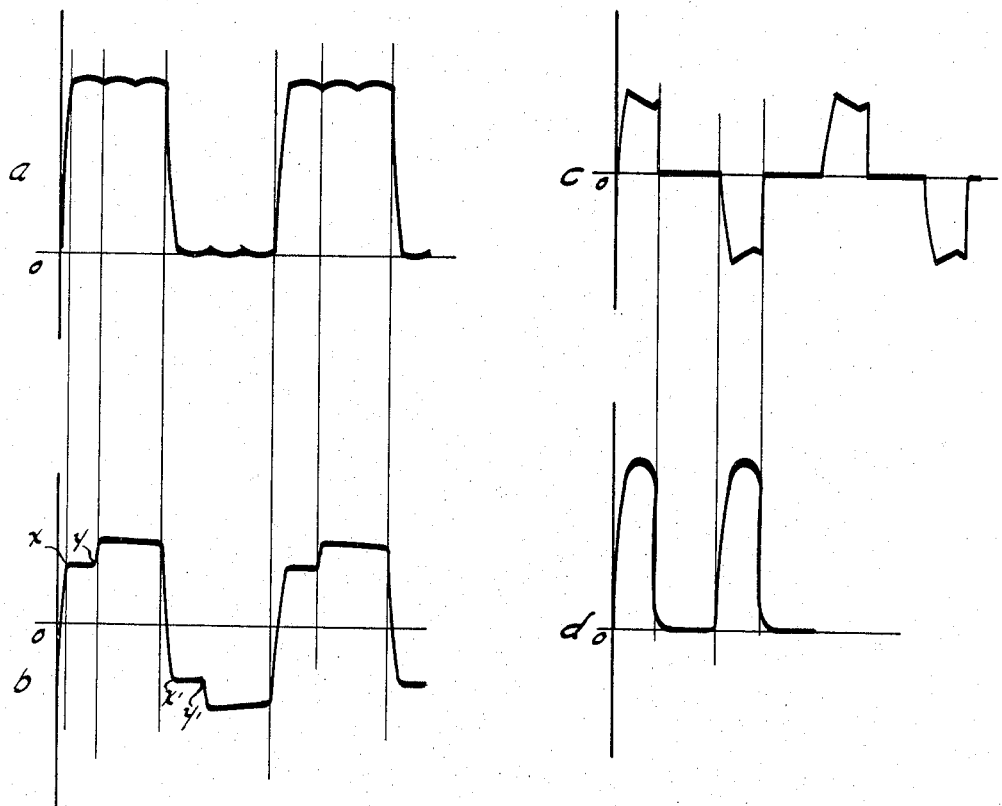
FIGURE 3 is a showing of the wave forms appearing at various locations throughout the circuit of FIGURE 2.

Referring now to FIGURE 2, there is shown an alternator which is typical of the type now used in the ignition system of many automobiles now on the market. The alternator comprises a 3-phase alternating current generator 42 in connection with a bridge type rectifier 44. Although the A.C. generator 42 is shown in Y connection it is to be understood that the invention is operable with those alternators which use delta connected generators.

The bridge type rectifier 44 is made up of 3 sets (46A, 46B, 46C) of diodes 48, 48A through F. The diodes in each set are unidirectionally connected in series across a storage battery 50 in a reverse biased mode. The windings of the alternator 42 are each connected with a respective set of diodes at the junctions 52A through C between the unidirectionally connected diodes.

A negative terminal of the battery 50 and the anodes of each of the diodes 48B, 48E and 48F are connected to ground at 53 by means of conductor 56. Terminal 58 which is in connection with the positive terminal of battery 50 and the cathodes of diodes 48A, 48B and 48C through conductor 60 serves as the power source for the engine ignition circuit 62.

The alternator 40, as hereinbefore described, operates in a well known manner to provide the power for the ignition circuit as well as maintain the storage battery 50 in a charged condition. The bridge rectifier 44 converts the 3-phase output from the A.C. generator 42 into D.C. power across the alternator D.C. output terminals 53, 58 and the storage battery 50.

Most alternators in use today in automobile ignition systems include at least one A.C. terminal 64 which is connected directly to one of the sets of diodes at the junction 52 therebetween (in this case junction 52C). The A.C. signal output from the A.C. generator 42 through conductor 66 causes the A.C. terminal 64 to alternate between ground voltage and a positive voltage approximating the value of the D.C. voltage at terminal 58. The diodes 48C, 48F generally being of the silicon type cause very little voltage drop thereacross when biased in the forward direction so that the voltage wave formed at terminal 64 approaches a substantially square wave shape as shown in FIGURE 3a. Since the A.C. generator 42 in the alternator 40 is mechanically driven by the automobile engine, the frequency of the square wave voltage appearing at terminal 64 is indicative of the speed of the engine. A tachometer circuit 68 utilizes the square wave signal to drive a meter 70 to indicate engine speed in a manner as hereinafter described.

There is provided a saturable transformer 72 with a primary winding 74 having one end connected to A.C. terminal 64 by means of conductor 76. The other end of primary 74 is connected through alternate paths including current limiting resistors 78a and 78b to the positive terminal 58 and ground terminal 53, respectively.

The secondary winding 80 of saturable transformer 72 has a pair of diodes 82a and 82b connected back to back thereacross. The resistance element 84 of the potentiometer 86 is connected between center tap 88 at the secondary 80 and a junction 90 between the back to back connected diodes 82a and 82b. This secondary circuit forms a full wave bridge rectifier in which the winding 80 forms the input and the portion 91 of resistance element 84 of potentiometer 86 between the wiper element 92 and the end connected to center tap 88 forms the rectified D.C. output. Potentiometer 86 serves as a calibration adjustment which may be set on installation in the vehicle and virtually ignored thereafter. The meter 70 in series with resistor 96 are connected in shunt across the portion 91 of the potentiometer 86 to thus register the voltage drop thereacross. A negative coefficient resistor 98 such as a thermistor is connected in parallel across resistor 96 to provide temperature compensation for the tachometer.

The voltage wave formed across the primary coil is a substantially square wave as is shown in FIGURE 3a. The current through the primary drives the transformer core into saturation and its wave form is shown in FIGURE 3b.

Figure 4:
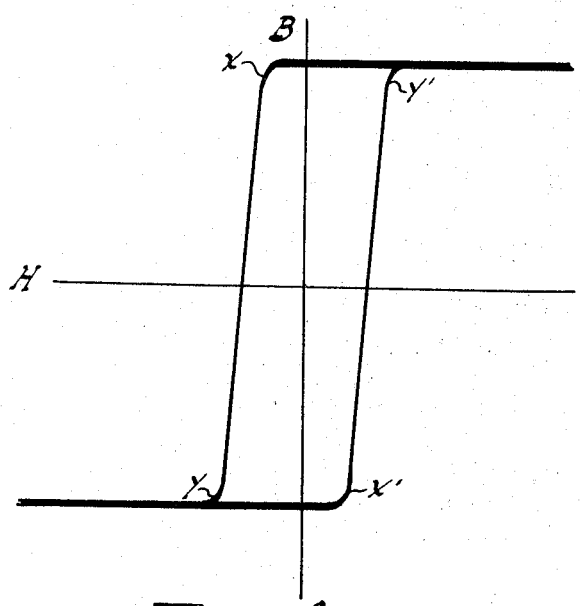
FIGURE 4 is a graphical representation of the magnetization curve of the saturable transformer.

The current in the primary initially follows the leading edge of the voltage thereacross in view of the saturation of the core. However, at the point X of the current wave form the flux density in the core drops below saturation and the inductance of the primary winding provides a high impedance to current flow causing it to level off. The flux in the core changes direction and reaches saturation in the other direction at point Y whereat the current begins to increase rapidly again until it reaches a value determined by the value of the limiting resistors 78a or 78b. The saturation points X and Y are also shown on the B–H curves for the transformer in FIGURE 4. When the polarity of the voltage across the primary reverses, the current therethrough drops and reverses to the opposite direction with the respective saturation points of the core being indicated at X' and Y' on FIGURE 3b and FIGURE 4.

The voltage induced across the secondary is substantially as shown in FIGURE 3c, and, as may be seen, is a function of the transformer saturation time and of the current in the primary. The current in the secondary circuit across the portion 91 of the potentiometer is substantially as shown in FIGURE 3d and the average voltage drop thereacross is a function of the frequency of the pulses.

The saturable transformer permits the tachometer to be applicable over an extended range of engine speeds using cheaper components than found in ordinary tachometers. The transformer 72 provides impedance matching between the meter 70 and the pulse supplying alternator 40 so that more power is available to the meter while using low time constant determining components. The inductance of the saturable transformer primary and the resistance of the current limiters 78a and b are low enough to accurately follow the pulse output of the alternator when the engine is running at top speed. Sufficient power is available in the secondary circuit of the saturable transformer 72 even at the low speeds to drive a relatively inexpensive meter movement such as the wide scale type shown in U.S. Patent 3,005,951 issued to A. E. Gersch Oct. 24, 1961.

A wide scale meter of the Gersch type if used in previous drive circuits of the type shown in FIGURE 1 would materially limit the engine speeds with which the tachometer would be effective. In order to obtain sufficient current to drive the relatively insensitive meter the capacitor 26 would have to be so large a value as to make the RC time constant too long for the higher engine speeds.

It is to be noted that if a relatively high sensitivity meter is used with the present tachometer circuit the engine speed range will be increased even further. Likewise it would be possible to drive the meter using only one diode in the secondary circuit to supply a half wave rectified signal to the meter 70. This is to be contrasted with the prior art circuit in which two diodes 30 and 34 are always required.

The saturable transformer also provides a voltage regulation function in the circuit. As seen in the time versus primary current curves shown in FIGURE 5 the slope thereof (DI/DT) increases as the peak voltage of the pulse input to the primary increases. However, the time required for the core to become saturated is decreased by the amount $\tau_2$ minus $\tau_1$ so that the output voltage across the portion 91 of the potentiometer remains essentially constant and changes only with change in frequency of the pulses.

Another advantage of the tachometer disclosed herein is that it has universal application to positive or negative grounded ignition systems and no damage can be caused to the instrument by incorrectly connecting it to the alternator terminals. As may be seen, the primary circuit of the transformer 72 is symmetrical. As long as the conductor 76 is connected to the A.C. terminal 64 (FIG. 2) it does not matter which resistor 78a or 78b is connected to ground terminal 53 or the hot terminal 58. Even if the A.C. conductor 76 is mistakenly connected to ground terminal 53 or hot terminal 58 the device is merely rendered inoperative but no damage will result to the tachometer or alternator. For example, if resistor 78a were connected to the A.C. terminal 64 and conductor 76 were connected to ground, the current limiting resistor 78a would limit the current through the primary 74 of the transformer by limiting the current therethrough.

While a preferred embodiment of a tachometer embodying the invention has been shown and described in detail herein, it is to be understood that many modifications or additions may be made thereto without departing from the spirit of the invention. Thus it is intended to be bound only by the scope of the appended claims.

What is claimed is:

1. A circuit for use in operating an electrically powered meter from an engine driven alternator having three coils connected to a rectifier bridge for providing a direct current potential to two terminals connected to opposite poles of a battery for charging said battery with said bridge including two rectifiers for each coil serially connected across the poles of said battery and arranged to either pass or block current in the same direction with each two rectifiers having a terminal connected intermediate the respective two rectifiers to a respective one of the coils of said alternator whereby the potential at each intermediate terminal varies substantially as a square wave alternating between the potential at said two terminals in response to potentials generated across said coil, the circuit comprising a saturable transformer having a primary with one end of said primary connected to one of said intermediate terminals, a first resistor connected between the other end of said primary and either one of said two terminals, a second resistor connected between the other end of said primary and the opposite of either of said two terminals, a tap on the secondary of said transformer connected to one side of said meter, and a pair of unidirectional circuit elements respectively connected between opposite ends of the secondary of said transformer and the other side of said meter with said elements poled to pass current in the same direction from said secondary through said meter.

2. In the circuit claimed in claim 1, an adjustable resistance means serially connected to said pair of unidirectional circuit elements and to said tap.

3. In the circuit claimed in claim 1, a temperature sensitive electrical resistance element having one end connected to said tap and the opposite end connected to said meter.

4. The circuit claimed in claim 1 in which each of said rectifiers in said rectifier bridge is a silicon diode.

5. A circuit for use in operating an electrically powered meter from an engine driven alternator having a rectifier bridge connected to the output of said alternator for providing a direct current potential to two terminals connected to opposite poles of a battery for charging said battery with said bridge including two rectifiers serially connected across the poles of said battery and arranged to either pass or block current in the same direction and a terminal connected intermediate said two rectifiers to one of the coils of said alternator whereby the potential at said intermediate terminal varies substantially as a square wave alternating between the potential at said two terminals in response to potentials generated across said one coil the circuit comprising a saturable transformer having a primary with one end of said primary connected to said intermediate terminal and responding to the rise time of the wave generated across said one coil for saturating said transformer substantially independently of the frequency of said wave, a pair of resistors each connected to the other end of said primary and a respective one of said two terminals, and means connecting to the secondary of said transformer to said meter for driving said meter in accordance with the repetition rate of said wave for indicating the speed of said alternator.

References Cited by the Examiner
UNITED STATES PATENTS

| | | | |
|---|---|---|---|
| 2,972,107 | 2/1961 | Criswell | 324—70 |
| 3,044,013 | 7/1962 | Peck | 324—70 |

WALTER L. CARLSON, *Primary Examiner.*

M. J. LYNCH, *Assistant Examiner.*